(12) United States Patent
Humpenoeder

(10) Patent No.: US 12,723,734 B2
(45) Date of Patent: Sep. 1, 2026

(54) ILLUMINABLE DECORATIVE MULTILAYER COMPOSITE FOR A VEHICLE AND VEHICLE

(71) Applicant: MERCEDES-BENZ GROUP AG, Stuttgart (DE)

(72) Inventor: Jens Humpenoeder, Ulm (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/164,809

(22) PCT Filed: Feb. 1, 2024

(86) PCT No.: PCT/EP2024/052534
§ 371 (c)(1),
(2) Date: Sep. 12, 2025

(87) PCT Pub. No.: WO2024/188532
PCT Pub. Date: Sep. 19, 2024

(65) Prior Publication Data

US 2026/0243407 A1 Aug. 20, 2026

(30) Foreign Application Priority Data

Mar. 13, 2023 (DE) ..................... 10 2023 000 967.9

(51) Int. Cl.
*F21V 3/10* (2018.01)
*B32B 7/023* (2019.01)
(Continued)

(52) U.S. Cl.
CPC .............. *F21V 3/10* (2018.02); *B60Q 1/0017* (2013.01); *B32B 7/023* (2019.01);
(Continued)

(58) Field of Classification Search
CPC ......... B32B 7/023; B60Q 1/0017; F21V 3/10; F21W 2104/00; G02B 6/006
See application file for complete search history.

(56) References Cited

U.S. PATENT DOCUMENTS 7,866,858 B2 1/2011 Hirzmann
2001/0040393 A1 11/2001 Sano et al.
(Continued)

FOREIGN PATENT DOCUMENTS

DE 102007010328 A1 4/2008
DE 102017209177 A1 12/2018
(Continued)

OTHER PUBLICATIONS

International Search Report and Written Opinion mailed Apr. 9, 2024 in related/corresponding International Application No. PCT/EP2024/052534.
(Continued)

*Primary Examiner* — Keith G. Delahoussaye
(74) *Attorney, Agent, or Firm* — PATENT PORTFOLIO BUILDERS PLLC

(57) ABSTRACT

An illuminable decorative multilayer composite for a vehicle has an outer coating with a visible side and a rear side facing away from the visible side. The rear side of the outer coating has a light-conducting coating into which light can be coupled from a lateral edge of the decorative multi-layer composite. The composite also has a decoupling element, a carrier coating with a design element on a rear side of the light-conducting coating, and a paint coating arranged on a rear side of the carrier coating facing away from the light-conducting coating. The design element is an elevation of the carrier coating and the paint coating has a depression directed away from the carrier coating. A layer
(Continued)

applied to the paint coating or to the elevation by hot stamping is arranged in the depression.

4 Claims, 1 Drawing Sheet

(51) Int. Cl.

| | |
|---|---|
| ***B60Q 1/00*** | (2006.01) |
| ***F21V 8/00*** | (2006.01) |
| ***F21W 104/00*** | (2018.01) |
| ***G09F 13/18*** | (2006.01) |

(52) U.S. Cl.

CPC ......... *F21W 2104/00* (2018.01); *G02B 6/006* (2013.01); *G09F 2013/1822* (2013.01); *G09F 2013/1827* (2013.01)

(56) References Cited

U.S. PATENT DOCUMENTS

| | | | |
|---|---|---|---|
| 2014/0093665 | A1 | 4/2014 | Horibe et al. |
| 2020/0262335 | A1 | 8/2020 | Hawkins et al. |
| 2020/0316902 | A1 | 10/2020 | Lee et al. |

FOREIGN PATENT DOCUMENTS

| | | | |
|---|---|---|---|
| DE | 102020104078 | A1 | 8/2021 |
| DE | 102021003476 | A1 | 8/2021 |
| EP | 3787933 | B1 | 8/2022 |

OTHER PUBLICATIONS

Office Action created Dec. 1, 2023 in related/corresponding DE Application No. 10 2023 000 967.9.

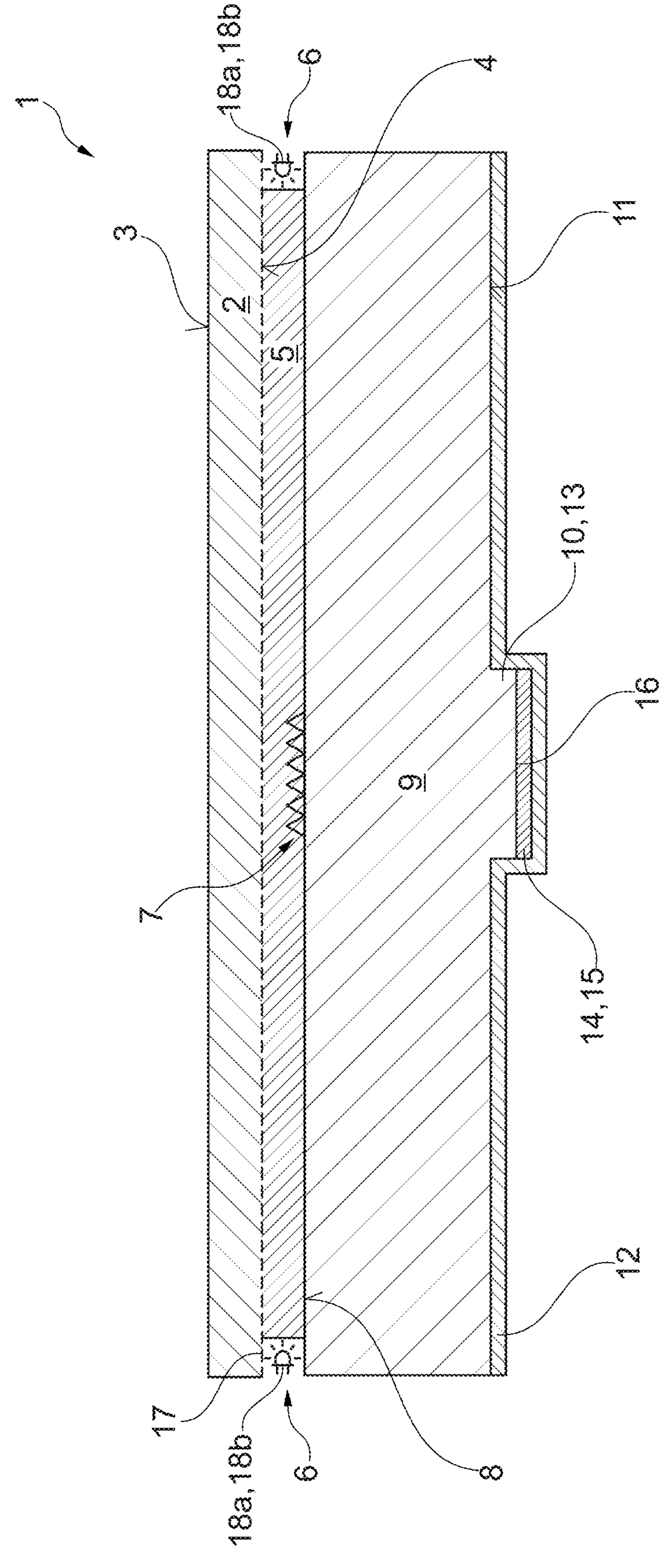
1
18a,18b
6
4
3
2
5
11
10,13
16
9
7
14,15
12
17
18a,18b
6
8

ILLUMINABLE DECORATIVE MULTILAYER COMPOSITE FOR A VEHICLE AND VEHICLE

BACKGROUND AND SUMMARY OF THE INVENTION

Exemplary embodiments of the present invention relate to an illuminable decorative multilayer composite, to a vehicle having such a decorative multilayer composite, and to a vehicle with such an attachment that can be illuminated by means of an illumination device or with such a decorative material composite that can be illuminated by means of an illumination device.

DE 10 2020 104 078 A1 discloses a decorative multilayer composite having a layered structure with light-permeable areas and configured to be backlit by means of an illumination device.

Exemplary embodiments of the present invention are directed to an improved or at least alternative embodiments for a decorative multilayer composite of the type mentioned at the outset and for a vehicle with such a decorative multilayer composite.

The present invention is therefore based on the basic idea of providing a decorative multilayer composite having an outer coating with a visible side that is visible from the outside and a rear side facing away from the visible side, and of arranging a light-permeable light-conducting coating configured for conducting light on the rear side of the outer coating into which light can be coupled from a lateral edge of the decorative multilayer composite and which has at least one light decoupling element for decoupling light. In addition, a light-permeable carrier coating is arranged on a rear side of the light-conducting coating facing away from the outer coating, which has at least one design element displaying information, patterns or symbols. The decorative multilayer composite also has a paint coating arranged on a rear side of the carrier coating facing away from the light-conducting coating. The at least one design element is assigned to the at least one light decoupling element so that the at least one design element and/or at least part of the paint coating is illuminable. At least one of the at least one design elements, preferably the respective design element, is configured as an elevation of the carrier coating projecting towards the paint coating. At least one design element is therefore a projection of the carrier coating projecting towards the paint coating. The paint coating has a depression directed away from the carrier coating for at least one of the one or more elevations. In the depression there is arranged a layer which is applied to the paint coating and/or to the elevation by means of hot stamping, so that the layer is embedded in a sandwich-like manner between the paint coating and the elevation.

In the decorative multilayer composite, the light-conducting coating that conducts light is therefore not located behind the decorative multilayer composite or the design elements as is the case with classic backlighting. Instead, it is integrated into the decorative multilayer composite between the outer coating and the carrier coating and thus placed in front of the least one design element. The design elements are thus illuminated from above, so to speak. This allows for more energy-efficient illumination of the decorative multilayer composite than has previously been possible. Furthermore, the light-conducting coating is designed to be relatively thin, for example as a light-conducting film, and configured so that light can be coupled from an edge of the decorative multilayer composite, for example via corresponding light coupling points, so that the proposed decorative multilayer composite is also relatively compact.

The at least one design element is visible from the outside, i.e., from the outer coating, in an unilluminated state of the decorative multilayer composite, and, in particular, creates a vividly three-dimensional effect. In an illuminated state of the decorative multilayer composite, i.e., when light is coupled into the decorative multilayer composite via the lateral edge of the decorative multilayer composite, in particular the at least one design element and, advantageously, also the paint coating are illuminated. This has the effect that the at least one design element and/or the paint coating create an optical light effect and are more visually prominent than in the unilluminated state of the decorative multilayer composite. In particular, the paint coating is largely perceivable in its original color.

The sandwich-like arrangement of the layer between the carrier coating and the paint coating results in the carrier coating or the elevation having a boundary surface on which the layer rests. In interaction with the elevation and/or the boundary surface, the layer creates an optically prominent light effect when the decorative multilayer composite is illuminated, i.e., when light is coupled into the decorative multilayer composite via the lateral edge. This can provide an additional or alternative optically prominent light effect when the decorative multilayer composite is illuminated.

Applying the layer by means of hot stamping, for example compared to applying it by means of physical vapor deposition, also known by the abbreviation "PVD", significantly simplifies the production of the decorative multilayer composite so that the decorative multilayer composite can be produced at an increased rate and/or more cost-effectively. This is particularly due to the fact that, in comparison to, for example, application by means of PVD, post-processing of the layer applied by means of PVD can be omitted. Since application by means of PVD is carried out over a large area, such post-processing includes, for example, removing the layer in places where it is not needed, for example where it is not to be illuminated and/or is to be displayed in the color of the vehicle. Another form of such post-processing is partial painting of the areas to be illuminated, for example in a contrasting color. Such post-processing is eliminated by hot stamping the layer.

The depression expediently defines a volume between the paint coating and the elevation in which the layer is arranged. The layer can fill the volume here.

The elevation and the depression are preferably arranged opposite one another.

The elevation can penetrate into the depression.

Preferred embodiments are those in which the layer is formed by paint, i.e., a layer of paint. This means that a layer of paint is applied to the paint coating and/or to the elevation by means of hot stamping.

Advantageously, the layer of paint is a different color to the paint coating. The layer is preferably a color that contrasts with the paint coating, in particular with the color of an associated vehicle outer skin.

The invention understands a coating as being, in particular, the outer coating and/or the light-conducting coating and/or the carrier coating and/or the paint coating, and a layer advantageously to be a surface structure. Furthermore, according to the understanding of the invention, the visible side of the outer coating is advantageously a component outer surface of the decorative multilayer composite that is visually perceptible to a user of the decorative multilayer composite. The component outer surface of the decorative multilayer composite can, for example, form a vehicle outer skin. According to the understanding of the invention, the term "translucent" advantageously means complete light permeability (transparency) or partial light permeability (translucency). The paint coating can be any color, for example the color of a vehicle's outer skin. The invention understands information, patterns or symbols, in particular, to be three-dimensional designs. The color of the paint coating can specify the color of an attachment described below.

Advantageously, the at least one design element is formed by a flat film element arranged in the carrier coating. The film element can, in particular, be arranged on the rear side of the light-conducting coating and connected to it, as well as extending from the rear side of the light-conducting coating into the carrier coating. Alternatively or additionally, provision can be made for the film element to be arranged on the rear side of the carrier coating and connected to it, as well as extending from the rear side of the carrier coating into the carrier coating. The film element can be firmly connected to the light-conducting coating, in particular by lamination.

Provision is preferably made for the film element to have at least one or more of the following features:

- a printed chrome film,
- a plastic film, in particular a polycarbonate film, with an indium coating and colored printing,
- a color-printed chrome film and a polycarbonate film with an indium coating,
- a screen-printed chrome film.

In preferred embodiments, the film element is formed from a printed chrome film. Provision may also be made for the film element to be formed from a plastic film, in particular a polycarbonate film, with an indium coating and colored printing. Alternatively, provision may be made for the film element to be formed from a color-printed chrome film and a polycarbonate film with an indium coating. Furthermore, the film element may be formed from a screen-printed chrome film. This provides advantageous embodiments for the proposed film element.

In particular, the decorative multilayer composite can have at least two or more design elements. In this case, at least one design element is formed by an elevation of the type described above. It is conceivable that at least one design element is also formed by a film element of the type described above. As a result, the decorative multilayer composite has various design elements that can be used to create a particularly striking optical effect or light effect.

Provision may also be made for the light-permeable light-conducting coating to be made of a plastic material, in particular polycarbonate (PC for short).

The light-permeable light-conducting coating may, in particular, have material properties promoting or allowing the light-conducting coating to be formed during the production of the decorative multilayer composite, for example by thermoforming. In the event that the film element described above is arranged on the light-conducting coating and connected to it, provision may advantageously be made for the film element to have material properties that promote or allow the film element to be formed together with the light-conducting coating during the production of the decorative multilayer composite, for example by thermoforming.

Provision may advantageously be made for the light-permeable carrier coating to made of a plastic material, in particular polycarbonate (PC for short) or polymethyl methacrylate (PMMA for short). Alternatively or additionally, provision may be made for the plastic material forming the light-permeable carrier coating to be sprayed onto the rear side of the light-conducting coating in a sprayable state. This allows the light-permeable carrier coating to be provided cost-effectively and, in particular, to be firmly connected to the light-conducting coating.

Provision may also advantageously be made for the outer coating to be formed from or have a hardcoat coating or a polyurethane coating (PU coating for short). This provides advantageous outer coatings.

Provision may advantageously be made for the at least one light decoupling element to be opposite the associated at least one design element. In particular, the at least one light decoupling element and the associated at least one design element can be opposite in a straight line. Furthermore, in particular, the at least one light decoupling element and the associated at least one design element can be arranged in a straight line, the straight line being perpendicular or substantially perpendicular to the flat visible side of the outer coating.

In order to improve the adhesion between the outer coating and the light-conducting coating, provision may further advantageously be made for an adhesive coating, in particular a primer coating, to be arranged between the outer coating and the light-conducting coating. The outer coating and the light-conducting coating are connected to one another by means of the latter.

The above-mentioned lateral edge of the decorative multilayer composite is advantageously formed by the narrow-area end faces of the coatings of the decorative multilayer composite. The narrow-area end faces of the coatings, i.e., the lateral edge, are advantageously perpendicular to the comparatively large-area visible side of the outer coating and/or perpendicular to a comparatively large-area rear side of the paint coating.

According to a further basic idea of the invention, provision is made for an attachment configured for mounting on a vehicle, which attachment has at least one decorative multilayer composite according to the above description.

According to a further basic idea of the invention, a vehicle is provided with at least one attachment illuminated by means of an illumination device according to the previous paragraph or at least one decorative material composite illuminated by means of an illumination device according to the above description.

Further important features and advantages of the invention emerge from the subclaims, from the drawings and from the associated description of the FIGURE with reference to the sole drawing.

It is understood that the features mentioned above and those to be explained below can be used not only in the respective combination specified, but also in other combinations or on their own, without departing from the scope of the present invention.

A preferred exemplary embodiment of the invention is shown in the single drawing and is explained in more detail in the following description, wherein the same reference numerals refer to the same or similar or functionally identical components.

BRIEF DESCRIPTION OF THE SOLE DRAWING FIGURE

Shown here is:

The sole drawing FIGURE is a highly simplified sectional view of a decorative multilayer composite according to a first embodiment.

DETAILED DESCRIPTION

The sole drawing FIGURE illustrates an illuminable decorative multilayer composite 1, that can be placed in an unilluminated and illuminated state. In the unilluminated state, light that has been provided is not coupled into the decorative multilayer composite 1, the decorative multilayer composite 1 producing, by means of at least one design element 10, vivid three-dimensional effects visible from the outside, i.e., from an environment 21. In the illuminated state of the decorative multilayer composite 1, light that has been provided is coupled into the decorative multilayer composite 1 via an edge 6 of the decorative multilayer composite 1, thereby illuminating the at least one design element 10. This creates an optical light effect that makes the vivid three-dimensional effects appear more pronounced than in the unilluminated state. Furthermore, this type of illumination allows a paint coating 12 of the decorative multilayer composite 1 to be perceived largely in its original color. Such a decorative multilayer composite 1 may, for example, be incorporated into an attachment intended for mounting on a vehicle (not shown further in each case) or form the attachment.

According to the sole drawing FIGURE, the decorative multilayer composite 1 has an outer coating 2, which has a visible side 3 facing the environment 21 and a rear side 4 facing away from the visible side 3. The outer coating 2 may, for example, be formed from or have a hardcoat coating or a plastic material such as polyurethane (PU). A light-permeable light-conducting coating 5 that is designed to be relatively thin, for example a light-conducting film, is arranged on the rear side 4 of the outer coating 2 and configured for conducting light. In order to improve the adhesion between the outer coating 2 and the light-conducting coating 5, use can be made of an adhesive coating 17, which is arranged in a sandwich-like manner between the outer coating 2 and the light-conducting coating 5. The adhesive coating 17 may be a primer coating. The light-conducting coating 5 has, for example, a light decoupling element 7 symbolized by simple triangles and configured for decoupling light. The light-conducting coating 5 ends at each end in such a lateral edge 6 of the decorative multilayer composite 1 so that light that has been provided there can be coupled into the light-conducting coating 5. The light required to illuminate the decorative multilayer composite 1 may, for example, be provided by an illumination device (not shown), in particular having LEDs, and coupled into the light-conducting coating 5. It is conceivable for the decorative multilayer composite 1 to have light coupling elements 18*a* or illuminants 18*b*, in particular LEDs, of the illumination device integrated into the light-conducting coating 5 in the region of the lateral edge 6 or arranged on the light-conducting coating 5.

In the exemplary embodiment shown, the light-conducting coating 5 is shaped during production of the decorative multilayer composite 1, for example by means of thermoforming, and then a light-permeable carrier coating 9 is applied, in particular sprayed, on a rear side 8 of the light-conducting coating 5 facing away from the outer coating 2. Plastic materials such as polycarbonate (PC) or polymethyl methacrylate (PMMA) are used for the carrier coating 9. In the present case, the carrier coating 9 has, purely by way of example, a single design element 10 displaying information, patterns, or symbols. Such information, patterns, or symbols can be produced, for example, through a three-dimensional design. The design element 10 is assigned to the light decoupling element 7, for example opposite it, so that it is illuminated when the decorative multilayer composite 1 is illuminated and unilluminated when the decorative multilayer composite 1 is unilluminated. The decorative multilayer composite 1 additionally has a paint coating 12, which is arranged on a rear side 11 of the carrier coating 9 facing away from the light-conducting coating 5. The paint coating 12 may in principle be any color, but a color that corresponds to the color of the vehicle's outer skin is preferred.

As can be seen in the sole drawing FIGURE, the design element 10 is formed by an elevation 13 of the carrier coating 9 projecting towards the paint coating 12. For the elevation 13, the paint coating 12 has, directed away from the carrier coating 9, a depression 16 arranged opposite the elevation 13 and, in the exemplary embodiment shown, shaped complementarily to the elevation 13. In the depression 16 there is arranged a layer 14 which is applied to the paint coating 12 and/or to the elevation 13 by means of hot stamping, so that the layer 14 is embedded in a sandwich-like manner between the paint coating 12 and the elevation 13. Compared to applying the layer 14 by means of physical vapor deposition, also known by the abbreviation "PVD", post-processing of the layer 14, for example removing the layer 14 in places where layer 14 is not needed (e.g. wherever the component is not to be illuminated and is to be displayed in the vehicle color), and/or partially painting the illuminated areas (in contrasting colors), can therefore be omitted.

In the exemplary embodiment shown, the layer 14 is a layer of paint 15 which, in particular, is a different color to the paint coating 12, preferably a color contrasting with the paint coating 12. As can also be seen from FIG. 1, in the exemplary embodiment shown, the elevation 13 penetrates into the depression 16.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An illuminable decorative multilayer composite for a vehicle, the illuminable decorative multilayer composite comprising:

an outer coating having a visible side and a rear side facing away from the visible side;

a light-permeable light-conducting coating arranged on the rear side of the outer coating and configured to conduct light to be coupled from a lateral edge of the illuminable decorative multilayer composite;

at least one light decoupling element configured to decouple light;

a light-permeable carrier coating comprising a plurality of design elements displaying information, patterns, or symbols and arranged on a rear side of the light-conducting coating facing away from the outer coating, wherein the plurality of design elements are associated with the at least one light decoupling element so that the plurality of design elements are illuminable; and a paint coating arranged on a rear side of the light-permeable carrier coating facing away from the light-permeable light-conducting coating, wherein the plurality of design elements are elevations of the light-permeable carrier coating projecting towards the paint coating, wherein at least one of the elevations is arranged opposite of a depression in the paint coating directed away from the carrier coating, and wherein a layer is arranged in the depression and is applied to the paint coating or to the at least one of the elevations by hot stamping so that the layer is embedded in a sandwich-like manner between the paint coating and the at least one of the elevations.

2. The illuminable decorative multilayer composite of claim 1, wherein the layer is a layer of paint that is a different color than a color of the paint coating.

3. The illuminable decorative multilayer composite of claim 1, wherein light-permeable the carrier coating penetrates into the at least one of the elevations.

4. A vehicle comprising:

an illumination device; and an illuminable decorative multilayer composite illuminable by the illumination device, wherein the illuminable decorative multilayer composite comprises an outer coating having a visible side and a rear side facing away from the visible side;

a light-permeable light-conducting coating arranged on the rear side of the outer coating and configured to conduct light to be coupled from a lateral edge of the decorative multilayer composite;

at least one light decoupling element configured to decouple light;

a light-permeable carrier coating comprising plurality of design elements displaying information, patterns, or symbols and arranged on a rear side of the light-conducting coating facing away from the outer coating, wherein the plurality of design elements are associated with the at least one light decoupling element so that the plurality of design elements are illuminable; and a paint coating arranged on a rear side of the light-permeable carrier coating facing away from the light-permeable light-conducting coating, wherein the plurality of design elements are elevations of the light-permeable carrier coating projecting towards the paint coating, wherein at least one of the elevations is arranged opposite of a depression in the paint coating directed away from the light-permeable carrier coating, and wherein a layer is arranged in the depression and is applied to the paint coating or to the at least one of the elevations by hot stamping so that the layer is embedded in a sandwich-like manner between the paint coating and the at least one of the elevations.

* * * * *